UNITED STATES PATENT OFFICE.

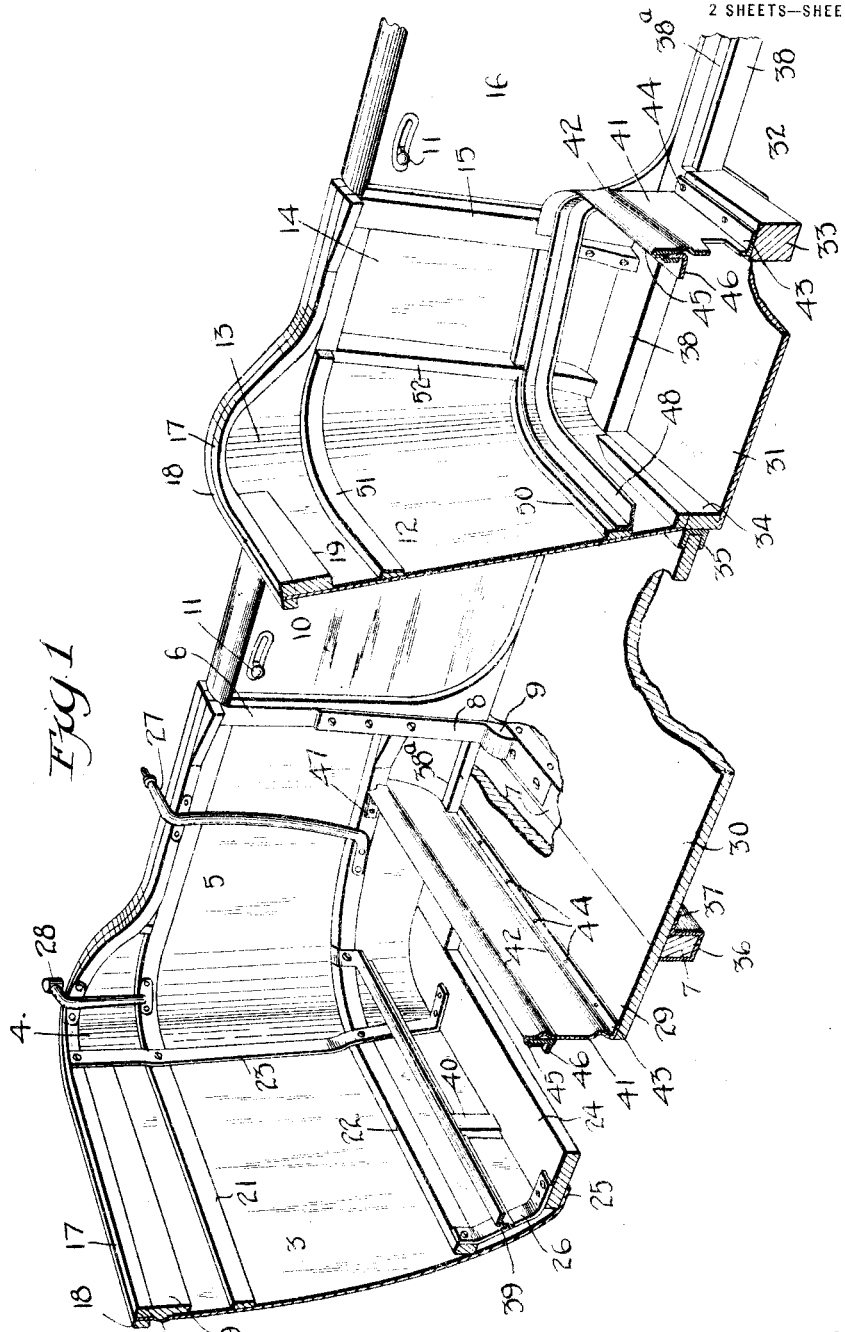

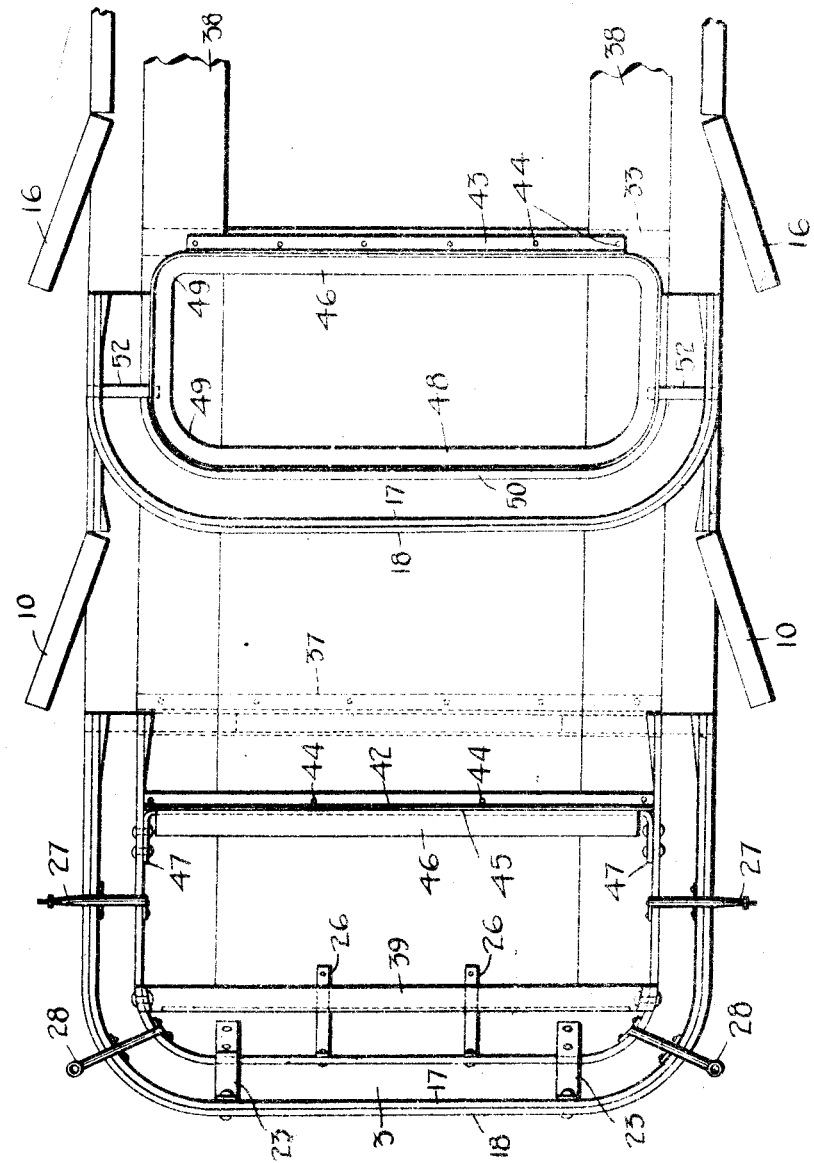

JAMES G. HEASLET, OF DETROIT, MICHIGAN, ASSIGNOR TO THE STUDEBAKER CORPORATION, A CORPORATION OF NEW JERSEY.

VEHICLE-BODY.

1,192,303.  Specification of Letters Patent.  Patented July 25, 1916.

Application filed February 4, 1915. Serial No. 6,075.

*To all whom it may concern:*

Be it known that I, JAMES G. HEASLET, a citizen of the United States of America, and resident of the city of Detroit, county of Wayne, State of Michigan, United States of America, have invented certain new and useful Improvements in Vehicle-Bodies, of which the following is a specification.

One of the difficulties experienced in the construction of vehicle bodies, especially motor vehicle bodies, is that of the weight of the body in view of the strains imposed upon it. It has been an aim of manufacturers to lessen the weight of the body without affecting the strength and rigidity of the body structure.

This invention appertains to improvements in the structure of the metal body which not only facilitates the assembling of the parts and lessens the weight, but gives greater strength and rigidity to the body, especially in restricting lateral and torsional strains.

Other objects and advantages of the invention will appear from the following detailed description taken in connection with the accompanying drawings.

An embodiment of the invention is shown in the accompanying drawings, but it is to be understood that the disclosure therein made is for the purpose of illustration, and that various changes and modifications are susceptible in the form and particular operation and arrangement of the parts within the scope of the appended claims.

In the drawings: Figure 1 is a perspective view, partly in section, through a vehicle body embodying the invention. Fig. 2 is a plan view.

In constructing metal bodies for motor vehicles, it is desirable to retain strength and rigidity with the least weight. In this invention a sheet of metal is provided which forms the rear seat plate and a part of the rear door frames, another sheet of metal forms the front seat plate and another part of the front door frames. These plates are reinforced by horizontal and vertical ribs and are maintained and strengthened in their proper relation against transverse and longitudinal strains by suitable transverse plates and bars, some of which serve as seat supporting elements, while others serve as floor supporting elements. The floor is sectional and supported from the seat-side plates.

Referring more particularly to the disclosure of the invention in the accompanying drawings, the rear plate 3 is bent at 4 to form the rear and sides 5 of the body. This plate extends to a vertical pillar 6 on each side of the body and the side pillars 6 may be connected to a transverse sill 7, preferably of non-metallic material, by suitable strap irons 8 of any preferred shape. In Fig. 1, these strap irons are shown comprising two members angularly disposed with a bend as at 9 at the union of the members. The rear doors 10 are preferably hinged so that the catches 11 engage suitable means in the pillars 6.

The front seat plate 12 is shown extending transversely across the body and bent at 13 to form the forward sides 14, terminating at the front pillars 15. Front doors 16 may be provided similar to the rear doors 10, with their catches 11 engaging means carried by the pillars 15.

Non-metallic ribs are shown extending along the upper edges of the plates 3 and 12 and conforming to the shape of the plates, the ribs 17 being on one side of the plates, while the ribs 18 are on the other sides thereof. A broad longitudinal rib 19 is shown near the top of each plate 3, 12 and the plates 3 or 12 may be recessed as at 20 to receive a bead on the rib 19. The rib 19 may be retained in position on the plate 3 or 12 by any suitable means. A plurality of longitudinal ribs 21, 22, of any suitable material, preferably laminated wood, are shown extending from one pillar 6 to another pillar 6. The upper rib 21 is shown engaging the top rib 17 for that portion thereof which extends from pillar 6 around the sides 5 of the body, and thereafter extends on the same plane around the bends 4 and the seat plate 3 to the pillar 6 on side 5 of the body forming a complete brace preventing either side sway or back strain. The lower rib 22, which may also be of laminated wood, is shown extending substantially parallel to the rib 21 from pillar 6 on one side of the body to pillar 6 on the opposite side thereof, but on a part of the body which is convenient to mount a seat supporting element. Like rib 21, and the trim rail, rib 22 serves as a brace for the plate 3. Vertical straps 23 may be employed to retain the ribs 17, 21, and 22 in their spaced relations, and these straps may also serve to support a rear section 24 of the floor. This floor section or sill 24 is shown positioned between the lower curved end 25 of the seat plate 3 and the ends of the straps 23. Shorter straps 26 may be employed which extend from the ribs 22 to the floor section 24, as shown in Fig. 1, such strap 26 being shown angular in form.

Cover retaining brackets 27, 28 may be supported from the ribs 17, 21 and 22, if desired thereby shortening the irons which heretofore have extended from the top to the sill 24.

The floor is shown in a plurality of sections 24, 29, 30, 31, and one or more sections may be placed at 32 in advance of the front seat. The front section 32 may be supported between the front or dash board (not shown) and the sill 33. The section 31 is shown secured to the sills 33 and 34. To one side of the sill is secured a channeled iron 35 with its channel directed toward the rear seat. The section 30, which is a quickly removable member of the floor, is shown with one end fitted within the channel of iron 35 while its opposite end may rest upon the non-metallic sill 7. This sill 7 may serve as a core for a channeled transverse casing member 36 which is shown provided with a flange 37 extending under the floor sections. The casing member 36 may be attached to the main side sills 38 and rests on the chassis frame and across the body, preventing springing of the body at this point.

The section 29 extends from the sill 7 to the plate 41 and is secured to the flange 43 of the latter by any suitable means.

It should be noted that the plates forming the sides, seats and rear end of the body, taper inwardly from the top to the bottom of the body, the converging lower part of the plates being turned inwardly as indicated at 25 in Fig. 1 to serve as a bearing around the base of the body to support the floor sections at the ends and edges thereof. These floor sections may be retained in position against the sides and end plates of the body by batten strips 38ª, or any other suitable means, and may further rest upon the longitudinal joists or sills 38 on the body. (Fig. 2.)

An important feature of the invention resides in the seat supporting element. In the embodiment illustrated, the rear seat is mounted upon a plurality of angle irons which eliminate cumbersome wood construction. One of said angle irons 39 is secured at its ends to one of the longitudinal ribs 22. These irons may be secured also to the short straps 26 and be further supported by struts 40 or any other suitable means.

At the forward end of each of the seats there may be provided a transverse supporting plate 41, which may be provided with longitudinal concavo-convex ribs 42. This metallic plate forms a combined cushion retainer and heel board, doing away with the usual cumbersome wood construction. The lower edge of plate 41 may be bent to form a floor engaging flange 43 adapted to receive suitable fastening means 44.

The upper edge of plate 41 is shown bent upon itself as at 45 to form a flange and thence into frictional engagement with one member of an angle iron 46 to retain the angle iron in position. If desired the angle iron 46 and the upper flange 45 may be secured by any other additional means, such as welding or rivets. This angle iron 46 is preferably secured to the plate 41 so that the angular portion thereof will bear against the shoulder formed by a concave portion of rib 42, which serves as a seat to prevent vertical movement of the angle iron. Angle iron 46 also stiffens the plate 41 on a side opposite to the rib 42. The ends of plate 41 may be secured to the sides of the body in any suitable manner, as at 47 in Fig.

In the front seat construction, the angle iron seat support 48 is shown as a continuous rectangular member with rounded corners 49, the angle iron 48 being suitably supported by the longitudinal rib 50 which may be of laminated wood secured to the front of the plate 12, as described. The rib 50 also forms a trim stick. The front seat may be provided with the longitudinal rib 51 similar to the rib 21 of the rear seat, and may also have the vertical pillars 52.

Besides serving as supports for the seats, the transverse plate 41 and the angle irons 39, 46, 48 serve as transverse strengthening members for the body.

Having thus described my invention, what I claim as new and desire to secure by Letters Patent is:

1. In a vehicle body, the combination of a rigid base frame, upstanding door posts at opposite sides of the frame, a back plate extending around the rear of the frame from one post to the other with its ends secured to said posts, an upstanding plate extending across the back plate and near the forward ends thereof, means at the upper edge of said plate for supporting the forward edge of a seat, a plurality of stiffening ribs arranged interiorly of the back plate, and in engagement therewith, for maintaining it in shape, and a transverse brace, secured at its opposite ends on one of said horizontal stiffening ribs, for supporting the rear portion of the seat.

2. An automobile body construction embodying a base frame for the body, a sheet metal plate rigidly mounted on the frame and shaped to form the back and sides of a seat, a horizontal wooden rib extending around the inner surface of said plate, and in engagement therewith, to maintain the plate in form, a seat, a seat supporting member suspended on the wooden rib for supporting the rear portion of the seat, and a transverse brace extending across the interior of said plate, near its forward edges, and underlying and supporting the forward portion of said seat.

3. A vehicle body including the sides and floor of a body structure, a transverse supporting plate adapted to engage the sides and the floor, and an angle iron strip, one edge of said plate being doubled upon itself to engage and retain in clamping relation one flange of the angle iron strip.

4. A vehicle body having a transverse supporting plate provided with a plurality of longitudinal reinforcing beads, one edge of said plate being bent to form a retaining flange at substantially right angles to the plate, while the other edge of said plate is doubled upon itself and into engagement with a member of an angle iron to retain the angle iron in coöperative relation to one of said beads.

5. A vehicle body including the sides, floor and transverse seat plate of a body structure, a substantially rectangular seat support of angular members mounted on said sides and seat plate, and a transverse supporting plate having a floor engaging flange and one of its edges bent to frictionally engage a member of the rectangular seat support to support the same.

6. In a metallic vehicle body, the combination of transverse seat plates, which plates are extended to form the sides of the body, a floor housed within lower portions of said plates, a plurality of transverse supporting plates secured at their opposite ends to the side portions of the seat plates, means at the lower edges of said supporting plates for supporting a portion of the floor, and seat supporting members, the upper edges of the supporting plates being bent over into gripping engagement with the seat supporting members.

7. In a metallic vehicle body, the combination with sides, floor, and transverse seat plates of a body structure, of a plurality of vertical ribs adapted to be secured to the sides, a plurality of horizontal ribs coöperating with the vertical ribs and extending across the seat plates, and transverse seat supporting elements engaging with one of said horizontal ribs.

8. In a metallic vehicle body, the combination with sides, floor and transverse seat plates of a body structure, of a plurality of vertical ribs adapted to be secured to the sides and seat plates, a plurality of horizontal ribs coöperating with the vertical ribs and extending across the seat plates and the sides, transverse seat angle irons secured to the lower horizontal ribs, and means to engage and support said transverse seat angle irons intermediate their contact with the horizontal ribs.

9. An automobile body construction embodying side and seat plates, door posts at the forward edges thereof and a rigid frame at the lower edges thereof, a floor housed within the lower portions of said plates, substantially horizontal stiffening braces in engagement with the inner surfaces of said plates and secured at their ends to the posts, seat supporting members suspended from said horizontal braces, and vertical braces coöperating with the horizontal braces and secured thereto.

10. In a vehicle body, the combination with the sides and seat plates, of a floor comprising a plurality of sections, a transverse flanged and channeled metallic member having a non-metallic core to support a plurality of floor sections, and another transverse channeled metallic member adapted to coöperate with said flanged and channeled member to support one of said floor sections.

11. In a vehicle body, a plurality of floor sills, one of which is provided with a channel opening to the side, the other floor sill being provided with a bearing flange, and a quickly removable floor section adapted to fit within the channel of one of said sills and to be seated on the other sill and its flange.

12. An automobile body construction embodying side and seat plates, door posts at the forward edges thereof and a rigid frame at the lower edges thereof, a floor housed within the lower portions of said plates, substantially horizontal stiffening braces in engagement with the inner surfaces of said plates and secured at their ends to the posts, and seat supporting members suspended from said horizontal braces.

13. An automobile body structure comprising floor beams and door posts mounted on said beams, and a sheet metal body structure mounted on said beams and secured to said posts, in combination with wooden braces longitudinally disposed within said sheet metal form and secured thereto and to said posts, seat retaining members interposed transversely within said body and secured to the opposite walls thereof, said seat retaining members operating also as braces for the body structure.

14. An automobile body construction embodying a base frame for the body, a sheet metal plate rigidly mounted on the frame and shaped to form the back and sides of a seat, a horizontal brace extending around the inner surface thereof and secured against movement relative thereto, a seat supporting member secured at its rear portion to the horizontal brace, and a transverse brace secured to the frame and underlying and secured to the forward portion of the seat supporting member.

15. A vehicle body embodying sides and a floor, in combination with a transverse plate, the opposite ends of which are secured to the sides, means at the lower portion of the plate serving as a floor support, and means at the upper portion of the plate serving as a seat support, said plate being provided with integral, longitudinal reinforcing beads intermediate its edges.

Signed by me at the city of Detroit, Michigan, this 29th day of January, 1915.

JAMES G. HEASLET.

Witnesses:
G. M. EGGLESTON,
R. E. SCRATCH.